F. W. WHITAKER.
TRACTOR WHEEL.
APPLICATION FILED AUG. 9, 1918.

1,348,070.

Patented July 27, 1920.
2 SHEETS—SHEET 1.

Witnesses
R. A. Thomas

Inventor
F. W. Whitaker
By Victor J. Evans
Attorney

F. W. WHITAKER.
TRACTOR WHEEL.
APPLICATION FILED AUG. 9, 1918.
1,348,070.
Patented July 27, 1920.
2 SHEETS—SHEET 2.
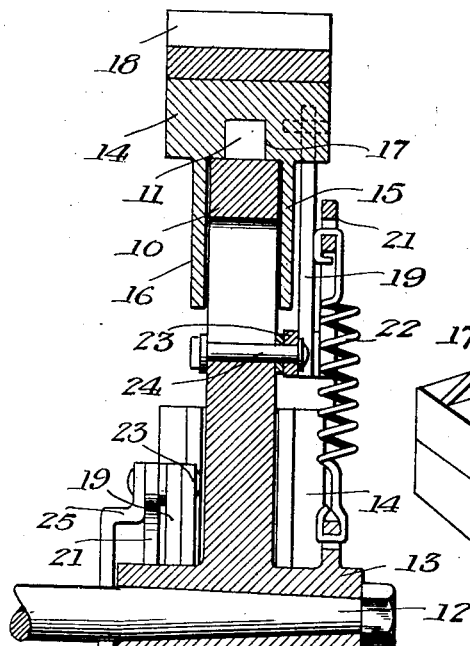
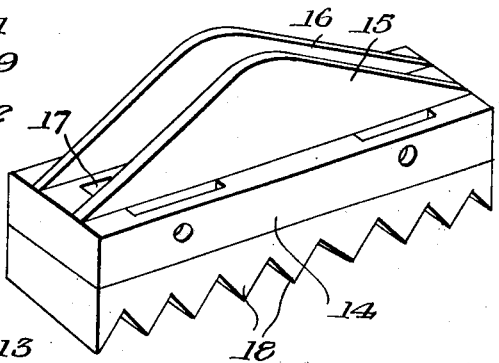
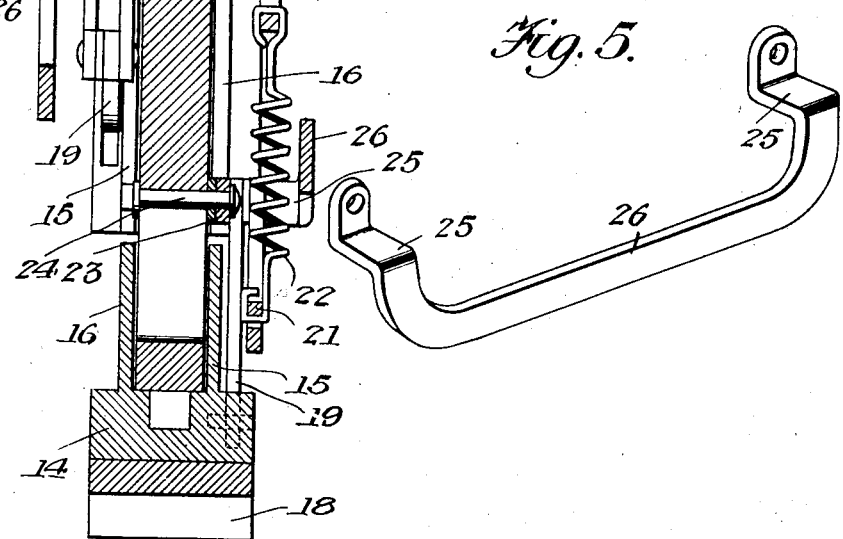
Witnesses
R. A. Thomas
Inventor
F. W. Whitaker
By Victor J. Evans
Attorney

UNITED STATES PATENT OFFICE.

FLETCHER W. WHITAKER, OF MEMPHIS, TENNESSEE.

TRACTOR-WHEEL.

1,348,070.　　　　　Specification of Letters Patent.　　Patented July 27, 1920.

Application filed August 9, 1918. Serial No. 249,150.

*To all whom it may concern:*

Be it known that I, FLETCHER W. WHITAKER, a citizen of the United States, residing at Memphis, in the county of Shelby and State of Tennessee, have invented new and useful Improvements in Tractor-Wheels, of which the following is a specification.

This invention relates to tractors, and is particularly directed to means for assuring the free travel of the tractor over a road, regardless of the condition of the road.

In carrying out the invention it is my purpose to provide a tractor wheel with shoes, so associated with the wheel as to engage the ground horizontally, affording a comparatively wide surface at this portion of the wheel and preventing the wheel from becoming embedded or mired in the ground.

It is also my purpose to produce a device of this character which shall be of a comparatively simple construction, automatic in action, and thoroughly effective for the purpose devised.

Other objects and advantages of my invention will appear after the nature of the invention is better understood, reference being had to the accompanying drawings, in which a satisfactory embodiment of the improvement is illustrated.

In the drawings:—

Fig. 2 is a sectional view approximately on the line 2—2 of Fig. 1.

Fig. 4 is a perspective view of one of the shoes; and

Fig. 5 is a similar view of one of the trip bars.

Figure 1:
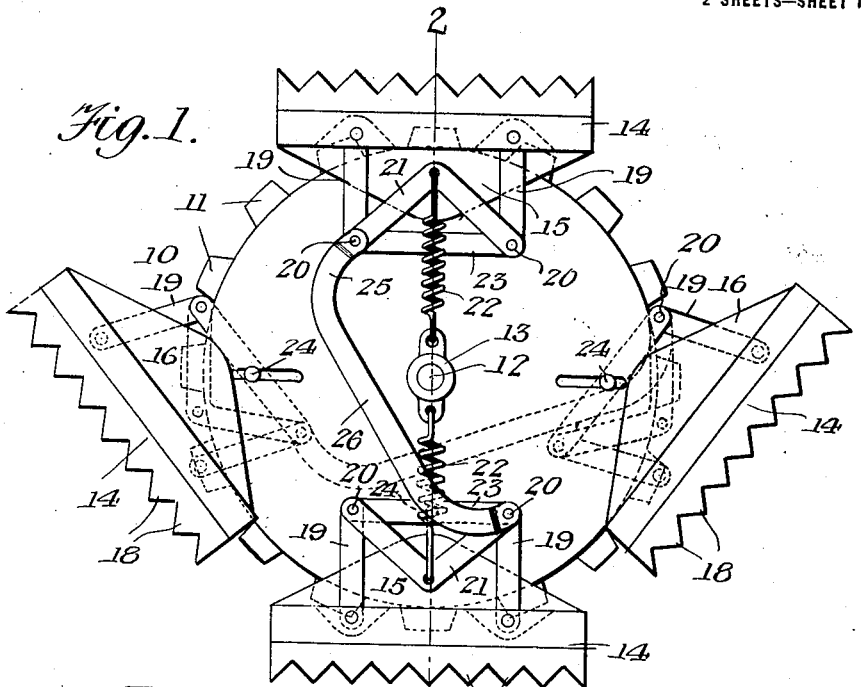
Figure 1 is a side elevation of a tractor wheel constructed in accordance with this invention.

In the drawings I have illustrated a single tractor wheel, but it is to be understood that both of the rear wheels of a tractor or similar vehicle are to be constructed as hereinafter described.

The wheel is indicated by the numeral 10, and, as disclosed by the drawing is provided with peripheral teeth 11. These teeth may be in the nature of spaced cleats, or the wheel may be integrally formed with the teeth.

The axle for the wheel is indicated by the numeral 12, and the wheel is preferably provided with a hub 13 that projects from both of its faces.

The shoes, which I employ in connection with the wheel 10 are in the nature of block members and are arranged upon a wheel in oppositely disposed pairs, each of the pairs being disposed approximately at right angles with respect to the other pair, so that one of the shoes is always in contact with the road surface.

The shoes are each of a similar construction, and are each generally indicated by the numeral 14. Each of the shoes has its inner face channeled longitudinally, one of the side walls provided by the channel being indicated by the numeral 15 and the opposite side wall being indicated by the numeral 16. The lower wall of the channel is provided with spaced depressions 17 and in these depressions the teeth 11 of the wheel 10 are adapted to be received. Each of the shoes 14 preferably comprises two sections, the inner section being, as stated in the nature of a block, and the other section being in the nature of a flat tread, which may, and preferably has its other face provided with transverse V-shaped depressions forming intersecting transverse V-shaped teeth 18.

By reference to the drawing it will be noted that the sides 15 of the coacting respective pairs of shoes are arranged upon the reverse sides or faces of the wheel 10, and the purpose for this arrangement will presently be apparent.

To the sides 15 adjacent the ends thereof are pivotally connected links 19, the said links having their free ends loosely connected as at 20 to the ends of the angle plates 21. Centrally secured to each of the angle plates 21 is a spring 22 that is connected either to the hub 13 or to a collar arranged on the hub or on the opposite faces of the wheel 10. Connected with the pivots 20 are the ends of a strap 23, and this strap is centrally pivoted as at 24 to the wheel 10, the said pivots passing through elongated openings in the said wheel. To the diagonally opposed pivots 20 of the links 19 of the coacting respective pairs of shoes are secured the offset arms 25 of evener bars 26, one bar being arranged on each of the faces of the wheel 10, and, as stated, connected to the pivots 20 are the links and angle plates 21 of the respective coacting shoes 14.

The springs 22 hold the shoes against the wheel, so that the teeth of the wheel will at all times engage in certain of the notches of the shoes.

Figure 3:
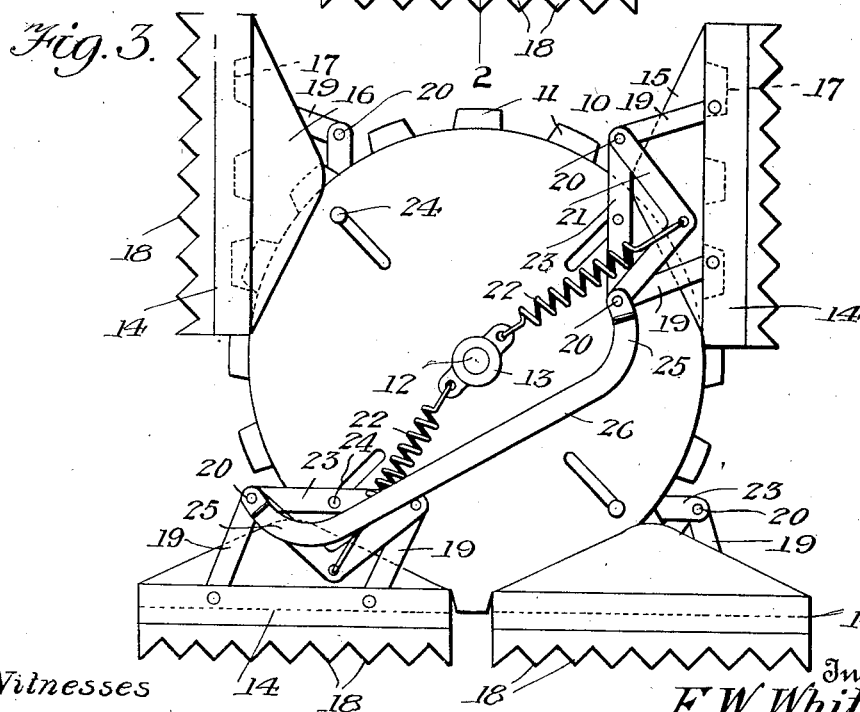
Fig. 3 is a side elevation but illustrating the arrangement of parts when the wheel is turned to bring two of the shoes in ground contacting position.

Assuming the parts in the position illustrated in Fig. 1 of the drawings, it will be noted that one of the shoes is in ground contacting position. The spring 22 connecting this shoe to the hub of the wheel retains the links 19 vertically and the strap 23 horizontally. The same condition exists with respect to the shoe, links and strap disposed diametrically opposite and co-acting with the ground contacting shoe. The evener bar 16 is disposed at an angle. The coöperating pairs of shoes disposed to the opposite ends of the ground engaging shoes are arranged at opposite angles with respect to each other, and with respect to the ground contacting shoe. This is an important feature of the construction, inasmuch as the shoe to the right of the wheel is to be brought next into ground engaging position, the shoe to the left having just left the ground, it being assumed that the wheel is traveling to the right. Were the springs 22 connected directly to the center of the shoes and not to the angle plates the last mentioned shoes would assume a right angular position with respect to the wheel, so that their toothed surfaces would be vertical. However, the springs 22 being connected to the center of the angle plates and the said bars being pivotally connected with the links which in turn are pivotally connected to the shoe, permit of said shoe assuming such positions. The slots through which the pivots 24 pass may be comparatively short, as no determined link movement of the pivots is necessitated. The evener bar connecting the last mentioned shoes is so moved by the action of the springs upon the pivotally connected elements of the shoes as to be moved longitudinally by the action of the springs, and consequently maintain the shoes in their varying positions on the turning of the wheel. It will, of course be understood that the inward limit of the shoes with respect to the wheel is limited by the contacting of the said shoes with the said wheel. When the wheel is further turned, say to the position illustrated in Fig. 3 (and in this connection it should be stated that for the purpose of illustration the showing of Fig. 3 is somewhat exaggerated), the wheel travels a determined distance over the ground engaging shoe and the teeth thereof co-engaging with the notches in the shoe illustrated in Fig. 1 which will next be brought to ground contacting position, as disclosed in Fig. 3, will cause the said shoe to engage with the ground before the last mentioned shoe has entirely left the ground. This is also permitted by the pivotally connected links, straps, angle plates and evener bars. Again referring to Fig. 1 we will suppose that the wheel is turned until the spring 16 on one of the angle plates of say the shoe to the left hand side of the said figure is brought into longitudinal alinement with the axial center of the shaft 12 or in other words is brought to a horizontal position. This will cause the links 19 to also assume a horizontal position, but as the wheel is further turned to bring the spring off the horizontal center the said shoe will be swung to a position substantially similar to that illustrated in the upper left hand corner of Fig. 3. It will be noted that the construction is such that the parts coöperate in a manner to properly arrange one of the shoes at the desired angle to bring the same into ground engaging position and to also arrange the shoe that has previously engaged with the ground at such a slight angle that the said shoe may move off of the ground in a manner which will not impart injury thereto nor to the road bed.

What I claim is:—

The combination of a tractor wheel having a toothed periphery; of shoes arranged in oppositely disposed co-acting pairs on the wheel, said shoes having their inner faces channeled and the inner walls of the channels notched to receive the teeth of the wheel, links arranged in pairs pivotally connected to the respective shoes, an angle plate pivoted to the links, a strap having its ends connected by the last mentioned pivots of the links and angle plates of each shoe, a central pivot member on each strap which movably engages with the wheel, an evener bar having offset ends which are pivotally secured to the diagonally opposed links of the respective co-acting shoes and springs connected with the hub of the wheel and with the center of each of the angle plates, all as and for the purpose set forth.

In testimony whereof I affix my signature.

FLETCHER W. WHITAKER.